United States Patent
Jurk (10) Patent No.: US 10,830,595 B2
(45) Date of Patent: Nov. 10, 2020

(54) METHOD AND DEVICE FOR PROVIDING DATA FOR A GEOMETRIC MAP FOR AUTONOMOUS OR AUTOMATED DRIVING OF A VEHICLE

(71) Applicant: Bayerische Motoren Werke Aktiengesellschaft, Munich (DE)

(72) Inventor: Reinhard Jurk, Groebenzell (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 323 days.

(21) Appl. No.: 15/926,858

(22) Filed: Mar. 20, 2018

(65) Prior Publication Data

US 2018/0209798 A1    Jul. 26, 2018

Related U.S. Application Data

(63) Continuation of application No. PCT/EP2016/069887, filed on Aug. 23, 2016.

(30) Foreign Application Priority Data

Sep. 21, 2015    (DE) .................. 10 2015 218 041

(51) Int. Cl.
| | |
|---|---|
| *G01C 21/32* | (2006.01) |
| *G01C 21/36* | (2006.01) |
| *G05D 1/02* | (2020.01) |

(52) U.S. Cl.
CPC ............ *G01C 21/32* (2013.01); *G01C 21/36* (2013.01); *G05D 1/0212* (2013.01); *G05D 1/0274* (2013.01); *G05D 2201/0213* (2013.01)

(58) Field of Classification Search
CPC ...... G01C 21/32; G01C 21/36; G05D 1/0212; G05D 1/0274; G05D 2201/0213
See application file for complete search history.

(56) References Cited

U.S. PATENT DOCUMENTS

| | | | | |
|---|---|---|---|---|
| 5,525,998 A | * | 6/1996 | Geier ................. | G01C 21/28 342/357.3 |
| 6,243,657 B1 | * | 6/2001 | Tuck ................. | G01N 29/2412 702/150 |

(Continued)

FOREIGN PATENT DOCUMENTS

| | | |
|---|---|---|
| DE | 10 2013 208 521 A1 | 11/2014 |
| DE | 10 2013 211 696 A1 | 12/2014 |

OTHER PUBLICATIONS

PCT/EP2016/069887, International Search Report dated Nov. 24, 2016 (Two (2) pages).

(Continued)

*Primary Examiner* — Tyler J Lee
(74) *Attorney, Agent, or Firm* — Crowell & Moring LLP (57) ABSTRACT

A method for providing data for a geometric map for autonomous or automated driving of a vehicle includes collecting and/or determining odometry data of the vehicle when driving along a respective specified route section of a plurality of route sections using specified vehicle sensors. The respective specified route section has a maximum driving length that is dependent on at least one of a detection precision of odometry data using a specified vehicle sensor system, and on a reproducibility of provided odometry data using specified vehicle actuators and/or vehicle actuating drives. The method also includes providing the collected and/or determined odometry data to a specified vehicle interface, and transmitting the collected and/or determined odometry data by the specified vehicle interface to an evaluation device.

15 Claims, 5 Drawing Sheets

(56) References Cited

U.S. PATENT DOCUMENTS

| | | | | |
|---|---|---|---|---|
| 8,910,010 B2* | 12/2014 | Cooke | ............... | G01C 21/32 |
| | | | | 714/752 |
| 9,104,206 B2* | 8/2015 | Biber | ............... | G05D 1/0259 |
| 2005/0046373 A1* | 3/2005 | Aldred | ............... | A47L 9/009 |
| | | | | 318/580 |
| 2007/0156286 A1* | 7/2007 | Yamauchi | ............ | G05D 1/0038 |
| | | | | 700/245 |
| 2008/0027599 A1* | 1/2008 | Logan | ............... | G05D 1/0234 |
| | | | | 701/23 |
| 2009/0043439 A1* | 2/2009 | Barfoot | ............ | G05D 1/0274 |
| | | | | 701/25 |
| 2012/0179321 A1* | 7/2012 | Biber | ............... | G05D 1/0259 |
| | | | | 701/25 |
| 2012/0254707 A1* | 10/2012 | Cooke | ............... | G01C 21/32 |
| | | | | 714/799 |

OTHER PUBLICATIONS

German Search Report issued in German counterpart application No. 10 2015 218 041.7 dated Jul. 29, 2016, with Statement of Relevancy (Nine (9) pages).

\* cited by examiner

METHOD AND DEVICE FOR PROVIDING DATA FOR A GEOMETRIC MAP FOR AUTONOMOUS OR AUTOMATED DRIVING OF A VEHICLE

CROSS REFERENCE TO RELATED APPLICATIONS

This application is a continuation of PCT International Application No. PCT/EP2016/069887, filed Aug. 23, 2016, which claims priority under 35 U.S.C. § 119 from German Patent Application No. 10 2015 218 041.7, filed Sep. 21, 2015, the entire disclosures of which are herein expressly incorporated by reference.

BACKGROUND AND SUMMARY OF THE INVENTION

The invention relates to a method and a corresponding device for providing data for a geometric map for autonomous or automated driving of a vehicle, a method and a corresponding device for providing a geometric map for autonomous or automated driving, as well as a method and a corresponding device for operating a vehicle.

A trajectory planning system for vehicles, which drive in a highly automated or even autonomous manner, places high demands on a sensor system of the vehicle, for example, on a radar sensor, cameras and/or a LIDAR sensor (light detection and ranging sensor), in order to plan a collision-free trajectory.

Detailed and highly precise map data are the prerequisite for highly automated driving. For this purpose, suitable maps require a resolution within the range of 10 centimeters. These maps, hereinafter referred to as highly precise geometric maps (HGM), comprise very precise information on the roadway, in particular very precise geometric data of a roadway, and indicate information, using which a respective vehicle can be very accurately localized. Driver assistance systems can benefit from these predictive map data, particularly with regard to autonomous driving functions.

To generate such maps, currently streets are driven through using special measuring vehicles that have a special sensor system that is, in particular designed to collect data with a very high level of spatial accuracy.

The task the invention is based on is creating a method and corresponding device to provide data for a geometric map for autonomous or automated driving of a vehicle that make an inexpensive and/or current provision of data possible.

The invention is characterized in accordance with a first and a second aspect by a method and corresponding device for providing data for a geometric map for autonomous or automated driving of a vehicle. Therein, when driving along a respective specified route section using a vehicle with specified vehicle sensors odometry data of the vehicle are respectively collected and/or determined. The respective specified route section has a maximum driving length that is dependent on a detection precision of odometry data by means of a specified vehicle sensor system and/or that is dependent on a reproducibility of provided odometry data by a specified vehicle actuators and/or vehicle actuating drive. The collected and/or determined odometry data are provided to a specified vehicle interface for transmission to an evaluation device.

This has the advantage that no special vehicles are required for the collection of data for the creation of a high-precision geometric map for autonomous or automated driving of a vehicle, but that the collection of data for creating the high-precision geometric map can occur using customer vehicles and/or consumer vehicles. This allows for a cost effective and timely provision of data for the creation of a high-precision geometric map.

For the route sections to be specified, preferably all or a plurality of routes within a specified territory are broken down into route sections that each have a specified driving length. The territory can, for example, comprise a road network of Europe and/or Germany. Due to errors when collecting odometry data and when reproducing the odometry data or re-driving the route of collected odometry data, this can result in deviations between a desired target position on a route and a position on the route that has actually been reached when using the collected odometry data for reproducing a trajectory driven by the vehicle. Herein, the driving length is specified in such a way, for example, that the deviation does not exceed a limit value. In order to determine the detection precision of the vehicle sensor system for collecting odometry data, reference sensors can be used that have similar characteristics, such as the sensors that are commonly installed in customer vehicles or consumer vehicles by automotive manufacturers.

Along the same lines, to determine the reproducibility of the provided odometry data, reference actuators and/or reference actuating drives can be used that have similar characteristics, such as the actuators or actuating drives that are commonly installed in customer vehicles or consumer vehicles by automotive manufacturers.

The odometry data for the specified respective route section can be respectively collected by various vehicles that drive along the route section at various times and/or by a single vehicle that drives along the route section several times.

In a favorable embodiment in accordance with the first and second aspect, a specified section type is respectively assigned to the route sections and the maximum driving length of the respective route section is dependent on the respectively assigned section type. Here, for example, the following section types can exist: Highway, road, passing town, residential side road, dirt road and so on. For example, a maximum driving length on a highway with few curves and diversion possibilities the maximum driving length can be greater than on a winding country road.

In a further favorable embodiment in accordance with the first and second aspect, the maximum driving length of the respective route section is dependent on at least one vehicle operating factor and/or one environmental factor that influences the steering behavior and/or the drive response of the vehicle. The vehicle operating factors and/or environmental factors can represent average values and/or empirical values that have been collected for the respective route section by a plurality of vehicles. This makes it possible to take the respective driving length for the respective route sections into consideration depending on marginal conditions that could influence the detection precision and/or the reproducibility for this route section.

In a further favorable embodiment in accordance with the first and second aspect, one piece of positioning information for the vehicle when driving along the respective route section is respectively ascertained and/or provided and the odometry data are provided being assigned to the positioning information of the vehicle. This makes a simple assignment of the received odometry data to the respective route sections possible, thereby facilitating the further processing thereof.

In a further favorable embodiment in accordance with the first and second aspect, the positioning information represents an ascertained and/or determined absolute or relative position of the vehicle and a deviation between a real position of the vehicle and the ascertained and/or determined position of the vehicle is less than 10 centimeters. The relative position preferably refers to the respective route section that the vehicle drives along and/or to a route section the vehicle will drive along in the immediate future and/or to a route section that the vehicle has driven along directly beforehand. Advantageously, this can be used to compare the respective odometry data that have been collected for the respective route section, for example from various vehicles. Furthermore, in this way, a driving route can be determined from the odometry data, for example, in connection with other route information.

The invention is characterized in accordance with a third and fourth aspect by a method and a corresponding device for providing a geometric map for autonomous or automated driving comprising a plurality of informational units. Herein, data that are provided in accordance with the method for providing data for a geometric map for autonomous or automated driving of a vehicle or in accordance with a favorable embodiment of the method for providing data for a geometric map for autonomous or automated driving of a vehicle are received. For the respective route sections, reference odometry data and/or a reference driving route and/or a reference trajectory is/are determined and/or updated and/or verified in each case depending on the respective odometry data. For the respective route sections, one informational unit is provided respectively that comprises the reference odometry data and/or the reference driving route and/or the reference trajectory of the respective route section.

Favorable embodiments of the first and second aspect are also valid for the third and fourth aspect.

In accordance with a fifth and sixth aspect, the invention is characterized by a method and a corresponding device to operate a vehicle. Herein, at least one informational unit for a specified route section, which is provided in accordance with the method for providing a geometric map for autonomous or automated driving in accordance with the third aspect, is received. Depending on data that the informational unit comprises, a target trajectory of the vehicle is determined for the specified route section. The vehicle can then be controlled depending of the identified target trajectory.

Favorable embodiments of the third and fourth aspect are also valid for the fifth and sixth aspect.

In accordance with another aspect, the invention is characterized by a computer program, wherein the computer program is designed to carry out the method in accordance with the first aspect or third aspect or fifth aspect and/or to carry out a favorable embodiment of the method in accordance with the first aspect and/or in accordance with the third aspect and/or the fifth aspect on a data processing device.

In accordance with another aspect, the invention is characterized by a computer program product, which comprises executable program code, wherein the program code carries out the method according to the first aspect and/or the third aspect and/or the fifth aspect and/or carries out a favorable embodiment of the method according to the first aspect and/or the third aspect and/or the fifth aspect during its execution using a data processing device.

The computer program product comprises in particular a medium that can be read by the data processing device, on which the program code is stored.

Other objects, advantages and novel features of the present invention will become apparent from the following detailed description of one or more preferred embodiments when considered in conjunction with the accompanying drawings.

BRIEF DESCRIPTION OF THE DRAWINGS

Exemplary embodiments of the invention shall be further explained in the following using the schematic drawing.

Elements of the same construction or function are marked with the same reference numbers throughout all the figures.

DETAILED DESCRIPTION OF THE DRAWINGS

Figure 1:
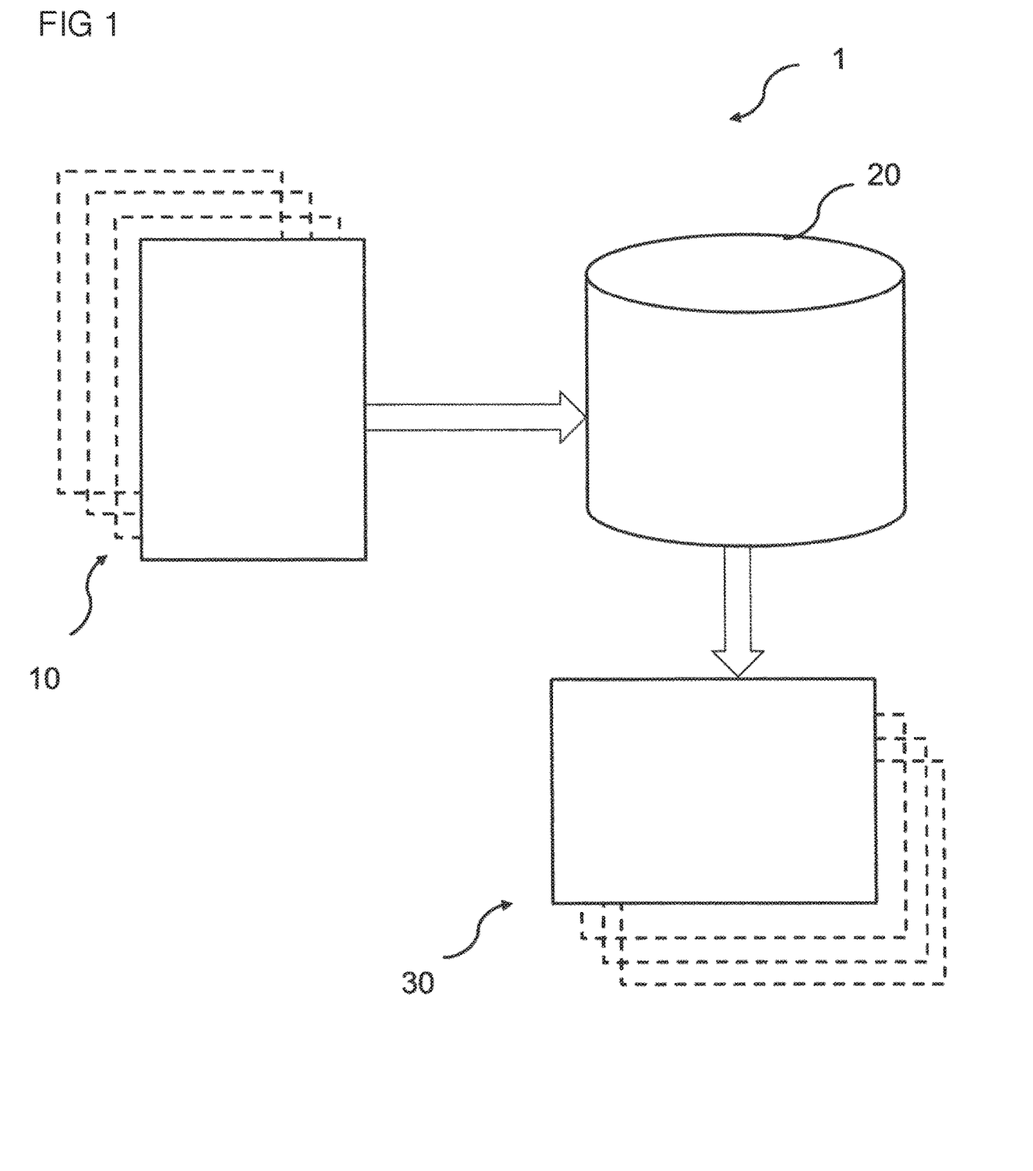
FIG. 1 shows a system to support an autonomous driving of vehicles.

FIG. 1 shows a system 1 to support autonomous driving of vehicles. The system 1 comprises at least one data collection device 10 that is situated in a vehicle. The data collection device 10 can also be called a device for providing data for a geometric map for autonomous or automated driving of a vehicle. Furthermore, the system 1 comprises an evaluation device 20 that, for example, is situated in a backend system of a vehicle manufacturer in a static manner. The evaluation device 20 can also be called a device for providing a geometric map for autonomous or automated driving. Furthermore, the system 1 comprises at least one control means 30, that is situated in the vehicle or in another vehicle. The control means 30 can also be called a device for operating a vehicle. Preferably, the system 1 comprises a plurality of data collection devices 10 and a plurality of control means 30. The at least one data collection device 10 and the at least one control means 30 can be designed within the respective vehicle as a control device for example.

The data collection device 10 has a specified sensor system that is designed to collect odometry data Phi, 1 of the vehicle, meaning a path the vehicle 1 has driven and a respective steering angle Phi of the vehicle and or to collect metrics that are representative for the path 1 driven and/or the steering angle Phi of the vehicle. The data collection device 10, for example, has a steering angle senor and a wheel sensor.

As an alternative, the sensor system can be assigned to the data collection device 10.

The data collection device 10, for example, has a computing unit and a memory. The memory can comprise a program memory and a data memory. The data collection device 10 is designed to carry out a first program for providing data for a geometric map for autonomous driving, for example by means of the computing unit and the memory.

Figure 2:
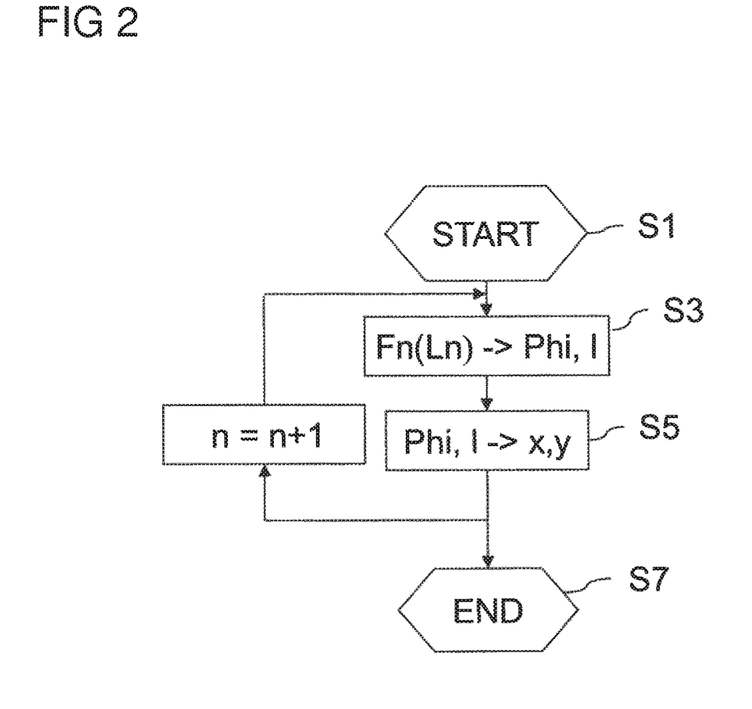
FIG. 2 shows an example flowchart for a first program for providing data for a geometric map for autonomous or automated driving of a vehicle.

An exemplary flowchart of the first program is shown in FIG. 2. The first program is started in a step S1, in which variables can be initialized if necessary. The data collection device 10 is, for example, designed to detect an entryway into one of the specified route sections Fn and to start the first program.

In a step S3, when driving along a specified route section with the vehicle, the odometry data (Phi, 1) of the vehicle are detected and/or determined using the specified sensor system. Herein, the specified route section Fn has a specified maximum driving length Ln.

Figure 3:
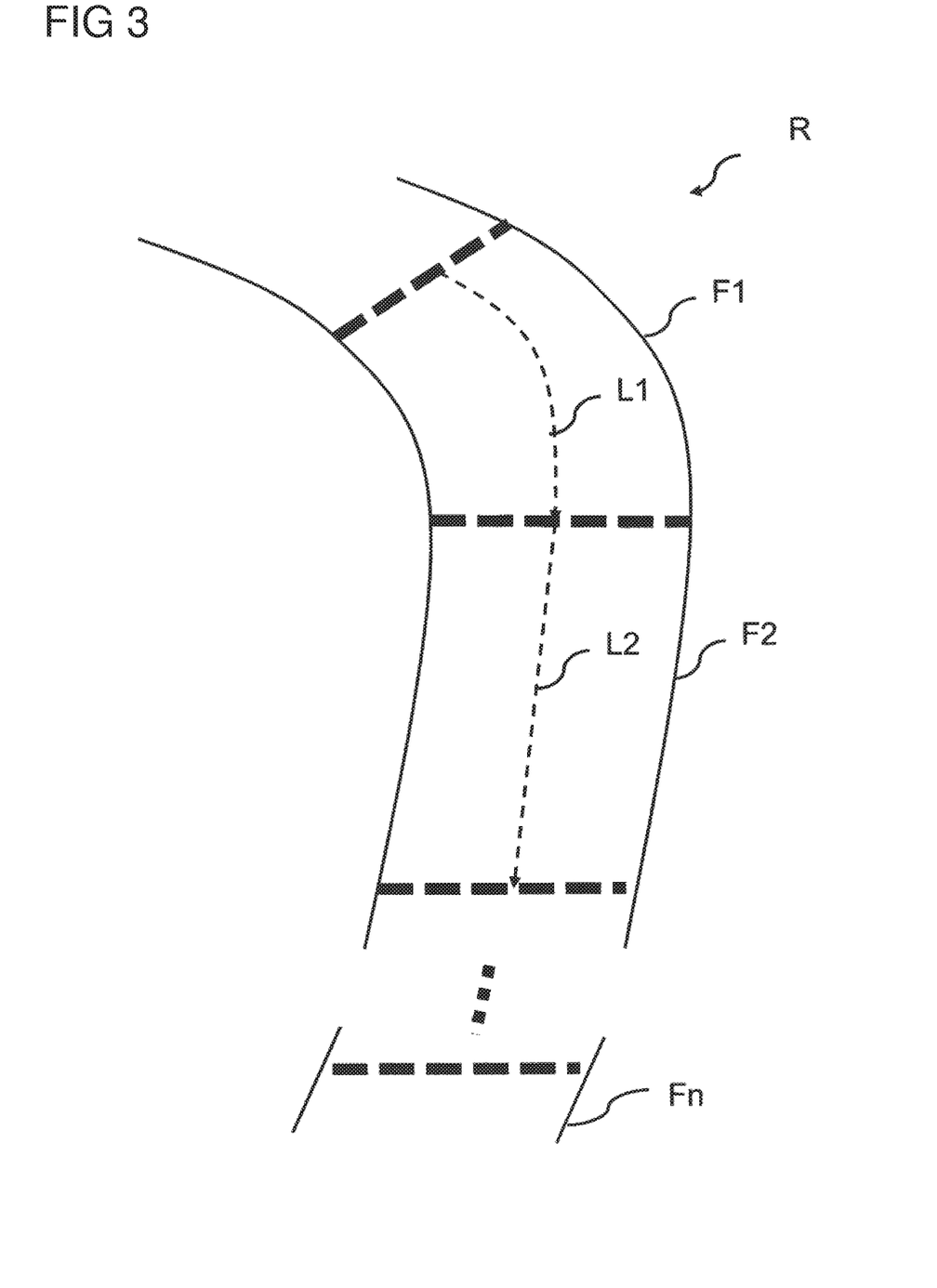
FIG. 3 shows a route with route sections.

The route sections Fn are, for example, specified in such a way that map data are provided for the data collection device 10, where routes R of a specified territory are respectively broken down into route sections Fn with a specified maximum driving length Ln (see FIG. 3). This territory can, for example, comprise a road network of Europe and/or Germany.

The maximum driving length Ln of the respective route section is herein specified, wherein the maximum driving length Ln of the respective route section is, for example, determined in advance depending on a detection precision of odometry data Phi, 1 by means of a specified vehicle sensor system and/or depending on a reproducibility of provided odometry data Phi, 1 by specified vehicle actuators and/or actuating drives.

The detection precision can, for example, represent an average detection precision of odometry data Phi, 1 which is determined and/or ascertained by a specified vehicle sensor system of vehicles.

The reproducibility can, for example, represent an average reproducibility of provided odometry data Phi, 1, which can be achieved by means of specified vehicle actuators and/or vehicle actuating drives of vehicles when using the provided odometry data Phi, 1 for the reproduction of a trajectory driven by the vehicle.

Due to both chains of imprecision, detection precision and reproducibility, the maximum driving length Ln of the respective route section Fn is several hundred meters depending on the precision of the detection and reproduction processes.

A specified section type can respectively be assigned to each of the route sections Fn and the maximum driving length Ln of the respective route section can be specified depending on the assigned section type. Here, for example, the following section types can exist: Highway, road, passing town, residential side road, dirt road and so on.

In addition or as an alternative, the maximum driving length Ln of the respective route section dependent on at least one vehicle operating factor and/or an environmental factor that influences the steering behavior and/or the drive response of the vehicle can be specified.

Herein, the vehicle operating factor, for example, represents an average tire temperature and/or an average tire air pressure of vehicles that drive along the respective route section Fn. Herein, the environmental factor is, for example, representative of an average outside temperature within a specified environment of the respective route section and/or representative of an average roadway surface temperature or an average wind velocity and/or wind direction within the specified environment of the respective route section.

The data collection device 10 is, for example, designed to detect an entryway into one of the specified route sections Fn and/or an exit out of the respective route section Fn.

For this purpose, for example, the data collection device 10 can be designed to respectively ascertain a piece of positioning information for the vehicle. Alternatively, positioning information can be provided by a further device of the vehicle. The positioning information can represent a determined and/or ascertained relative position with reference to the respective route section Fn or an absolute position of the vehicle.

The positioning information is, for example, ascertained in such a way that a deviation between a real position of the vehicle and the ascertained and/or determined position of the vehicle is less than 10 centimeters.

The positioning information can, for example, be ascertained depending on GNSS data (Global Navigation Satellite System Data) and/or environmental sensor data and/or data of a high-precision geometric map.

In a step S5, the ascertained and/or determined odometry data Phi, 1 are provided to a specified vehicle interface for transmission to the evaluation device 20. The interface preferably comprises an air interface.

In the step S5, the odometry data Phi, 1, for example, can be provided being assigned to the determined and/or ascertained positioning information x, y of the vehicle.

Then, the first program can be ended in a step, S7. Preferably, however, the first program is repeated for another route section Fn that the vehicle drives along.

The respectively ascertained and/or determined odometry data Phi, 1 are preferably transferred to the evaluation device 20. The evaluation device 20 is, for example, designed to receive the odometry data Phi, 1 from the data collection device 10 and/or a plurality of data collection devices 10 by means of a specified interface.

The evaluation device 20, for example, has a computing unit and a memory. The memory preferably comprises a program memory and a data memory.

The evaluation device 20 is designed, for example, to execute a second program for providing a geometric map for autonomous or automated driving by means of the computing unit and the memory. In the data memory of the evaluation device 20, for example, informational units B_n of the geometric map are stored. An informational unit B_n is respectively assigned to the specified route sections Fn, for which the odometry data Phi, 1 are respectively collected and/or determined.

Figure 4:
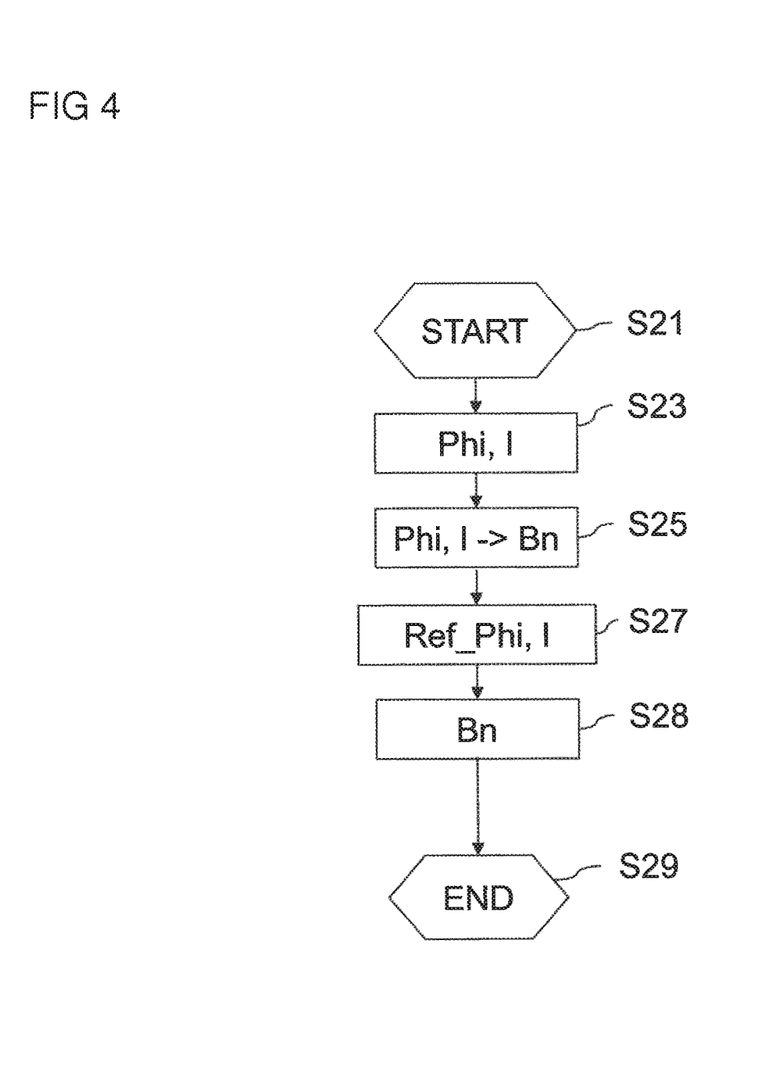
FIG. 4 shows an example flowchart for a second program for providing a geometric map for autonomous or automated driving.

An exemplary flowchart of the second program is shown in FIG. 4.

The second program is started in a step S21, in which variables can be initialized if necessary. For example, the second program is started when it has been detected that the at least one data collection device 10 has sent the ascertained and/or determined odometry data Phi, 1. Alternatively or in addition, the evaluation device 20 can be designed to call up the odometry data Phi, 1 from the respective data collection devices 10, in particular to call up the odometry data Phi, 1 from the respective data collection devices 10 at specified time intervals.

In a step S23, for example, the odometry data Phi, 1 that are sent by a vehicle are read in.

In a step S25, the odometry data Phi, 1 are assigned to an informational unit B_n of the geometric map.

In a step S27, for the respective route section Fn, reference odometry data Ref_Phi, 1 and/or a reference driving route and/or a reference trajectory are determined and/or updated and/or verified depending on the received odometry data Phi, 1.

In a step S28, for example, for the respective route section Fn, the informational unit B_n, which comprises the reference odometry data Ref_Phi, 1 and/or the reference driving route and/or the reference trajectory of the respective route section, is stored in the data memory of the central evaluation unit and can be called up by vehicles that use the informational units B_n of the geometric map. Alternatively or in addition, the determined and/or updated informational units B_n can be respectively sent to the user vehicles.

The informational units B_n can comprise other information concerning the respective route section Fn, for example, information on landmarks, a lane width, etc.

The second program can be ended in a step S29. In the case that the ascertained and/or determined odometry data Phi, 1 of the respective vehicles are received or called up again, the second program can be repeated.

Figure 5:
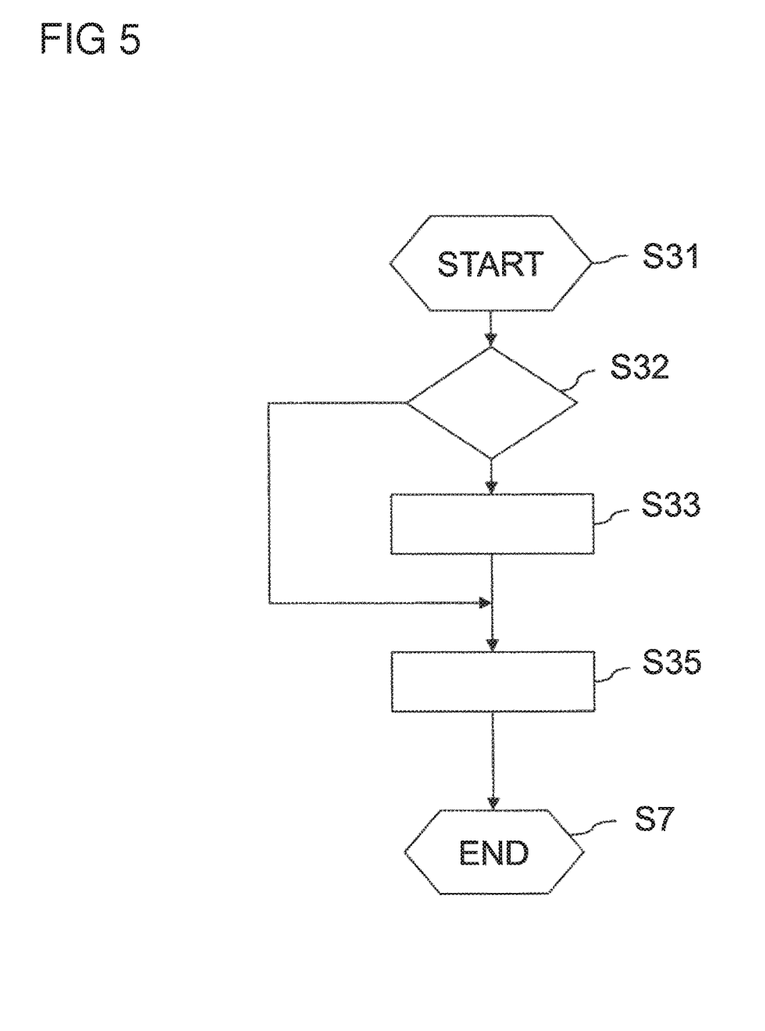
FIG. 5 shows an example flowchart for a third program for operating a vehicle.

FIG. 5 shows an example flowchart for a third program for the operation of a vehicle that is carried out by the at least one control means 30.

The control means 30 has a specified interface, for example an air interface, to receive the informational units B_n provided by the evaluation device 20.

The third program is started in a step S31, in which variables can be initialized if necessary.

In an optional step S32, it is checked, for example, if the informational units B_n stored in a memory of the control means 30 for a planned driving route of the vehicle are current. If the informational units B_n are current, the third program is continued in step S35.

If it is detected that the informational units B_n are partially not current or not available, in a step S33, for example, the non-current informational units B_n and/or lacking informational units B_n are downloaded by the central evaluation unit and stored within the memory of the control means 30.

In a step S35, a target trajectory of the vehicle is determined for the route section Fn to be driven for a respective route section Fn to be driven along by the vehicle depending on the data, which the informational unit B_n comprises, which is assigned to the route section Fn to be driven.

The step S35 can be repeated in accordance with the route sections Fn to be driven of the vehicle.

In a step S37, the program can be ended, for example, if the vehicle is parked.

REFERENCE LIST

1 System
10 Data collection device
20 Evaluation device
30 Control means
B_n Informational unit
Fn Route section
Phi,1 Odometry data
Ref_Phi, 1 Reference odometry data The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing data for a geometric map for autonomous or automated driving of a vehicle, the method comprising:
   determining a maximum driving length of a respective route section of a plurality of route sections of the geometric map, wherein the maximum driving length is determined based on at least one of:
      a detection precision of odometry data of a specified vehicle sensor system, and
      a reproducibility of provided odometry data using actuators and/or actuating drives of the vehicle;
   collecting and/or determining odometry data of the vehicle, via the specified vehicle sensor system, when the vehicle is driven along the respective specified route section;
   providing the collected and/or determined odometry data to a specified vehicle interface; and
   transmitting the collected and/or determined odometry data by the specified vehicle interface to an evaluation device.

2. The method as claimed in claim 1, further comprising assigning a specified section type respectively to each of the plurality of route sections, wherein the maximum driving length of the respective route section is dependent on the respectively assigned section type.

3. The method as claimed in claim 2, wherein the maximum driving length of the respective route section is dependent on at least one vehicle operating factor and/or one environmental factor that influences the steering behavior and/or the drive response of the vehicle.

4. The method as claimed in claim 3, where at least one informational unit for the specified route section is received and, based on data that the informational unit comprises, a target trajectory of the vehicle is determined for the specified route section.

5. The method as claimed in claim 2, further comprising:
   ascertaining and/or providing one piece of positioning information for the vehicle when driving along the respective route section; and
   assigning the odometry data for the respective specified route section to the positioning information of the vehicle.

6. The method as claimed in claim 5, wherein the positioning information represents an ascertained and/or determined absolute or relative position of the vehicle and a deviation between a real position of the vehicle and the ascertained and/or determined position of the vehicle is less than 10 centimeters.

7. The method as claimed in claim 1, wherein the maximum driving length of the respective route section is dependent on at least one vehicle operating factor and/or one environmental factor that influences the steering behavior and/or the drive response of the vehicle.

8. The method as claimed in claim 7, further comprising:
   ascertaining and/or providing one piece of positioning information for the vehicle when driving along the respective route section; and
   assigning the odometry data for the respective specified route section to the positioning information of the vehicle.

9. The method as claimed in claim 6, wherein the positioning information represents an ascertained and/or determined absolute or relative position of the vehicle and a deviation between a real position of the vehicle and the ascertained and/or determined position of the vehicle is less than 10 centimeters.

10. The method as claimed in claim 1, further comprising:
    ascertaining and/or providing one piece of positioning information for the vehicle when driving along the respective route section; and
    assigning the odometry data for the respective specified route section to the positioning information of the vehicle.

11. The method as claimed in claim 10, wherein the positioning information represents an ascertained and/or determined absolute or relative position of the vehicle and a deviation between a real position of the vehicle and the ascertained and/or determined position of the vehicle is less than 10 centimeters.

12. A device for providing data for a geometric map for autonomous or automated driving of a vehicle, wherein the device is configured to:
   determine a maximum driving length of a respective route section of a plurality of route sections of the geometric map, wherein the maximum driving length is determined based on at least one of:
      a detection precision of odometry data of a specified vehicle sensor system, and
      a reproducibility of provided odometry data using actuators and/or actuating drives of the vehicle;
   collect and/or determine odometry data of the vehicle, via the specified vehicle sensor system, when the vehicle is driven along the respective specified route section; and
   provide the collected and/or determined odometry data to a specified vehicle interface to be transmitted to an evaluation device.

13. The method as claimed in claim 1,
   wherein, for the plurality of route sections, reference odometry data and/or a reference driving route and/or a reference trajectory is/are determined and/or updated and/or verified in each case based on the respective odometry data; and
   wherein, for the plurality of route sections, one informational unit is provided respectively that comprises the reference odometry data and/or the reference driving route and/or the reference trajectory of the respective route sections.

14. The device as claimed in claim 12,
   wherein, for the plurality of route sections, reference odometry data and/or a reference driving route and/or a reference trajectory is/are determined and/or updated and/or verified in each case based on the respective odometry data; and
   wherein, for the plurality of route sections, one informational unit is provided respectively that comprises the reference odometry data and/or the reference driving route and/or the reference trajectory of the respective route sections.

15. A computer program product comprising non-transitory computer executable program code to provide data for a geometric map for autonomous or automated driving of a vehicle, wherein the non-transitory computer executable program code, when executed using a data processing device, is configured to:
   determine a maximum driving length of a respective route section of a plurality of route sections of the geometric map, wherein the maximum driving length is determined based on at least one of:
      a detection precision of odometry data of a specified vehicle sensor system, and
      a reproducibility of provided odometry data using actuators and/or actuating drives of the vehicle;
   collect and/or determine odometry data of the vehicle, via the specified vehicle sensor system, when the vehicle is driven along the respective specified route section driving along a respective specified route section of a plurality of route sections using specified vehicle sensors; and
   provide the collected and/or determined odometry data to a specified vehicle interface to be transmitted to an evaluation device.

* * * * *